United States Patent [19]

Hayashi et al.

[11] Patent Number: 4,574,929
[45] Date of Patent: Mar. 11, 1986

[54] VISCOUS FLUID COUPLING

[75] Inventors: Masaharu Hayashi, Toyota; Kenji Hattori, Kariya; Masato Itakura, Toyota, all of Japan

[73] Assignee: Aisin Seiki Kabushiki Kaisha, Japan

[21] Appl. No.: 600,350

[22] Filed: Apr. 13, 1984

[30] Foreign Application Priority Data

Apr. 14, 1983 [JP] Japan ................... 58-64572

[51] Int. Cl.$^4$ ........................ F16D 31/08; F16D 33/06
[52] U.S. Cl. ............................... 192/58 B; 192/82 T; 192/103 F
[58] Field of Search ............... 192/58 B, 82 T, 103 R, 192/103 F, 103 FA

[56] References Cited

U.S. PATENT DOCUMENTS

| 3,259,220 | 7/1966 | Roper | 192/58 B |
| 4,266,645 | 5/1981 | Crooks | 192/58 B |
| 4,312,433 | 1/1982 | Bopp | 192/58 B |
| 4,469,209 | 9/1984 | Hayashi | 192/58 B |

Primary Examiner—William L. Freeh
Attorney, Agent, or Firm—Finnegan, Henderson, Farabow, Garrett & Dunner

[57] ABSTRACT

A viscous fluid coupling including an input member having a disc-shaped rotor, an output member rotatable with respect to the input member and having a housing encircling the rotor, a partition wall in the housing for dividing the inside of the housing into an oil chamber and a working chamber. The rotor is located in the working chamber and a labyrinth device is provided between the rotor and the housing for making it possible to transfer rotation of the rotor to the housing under a supply of viscous oil to the labyrinth device. Perforations are formed in the partition wall for establishing a communication between the oil chamber and the working chamber so that the viscous oil can be supplied from the oil chamber to the working chamber. Oil expelling passages are also provided for connecting radially outward portions of the oil and working chambers so that the viscous oil in the working chamber is expelled to the oil chamber under pumping action of the rotor when the rotor is rotated. A valve is associated with the perforations in the partition wall and, a temperature responsive element is provided for actuating the valve so that the valve is moved between an open position wherein it opens the perforations and a close position wherein it closes the perforations in accordance with a temperature condition. Oil displacing blocks are disposed in the oil chamber and normally maintained at a radially inward position but forced radially outwardly under a centrifugal force when housing is rotated.

8 Claims, 5 Drawing Figures

VISCOUS FLUID COUPLING

The present invention relates to a viscous fluid coupling for transmitting rotation from an input member to an output member through viscous fluid.

Conventional viscous fluid couplings generally include an input member comprised of an input shaft having a disc-shaped rotor integral with or secured to the input shaft. There is also provided an output member which is connected with the input shaft of the input member through a bearing so that the output member is rotatable with respect to the input member. The output member has a housing which encircles the disc-shaped rotor and includes a surface confronting with one side surface of the disc through a labyrinth groove device. The inside of the housing is divided by a partition plate into a working chamber and an oil chamber which are connected by perforations formed in the partition plate. The disc on the input shaft is located in the working chamber. A valve plate is provided for closing the perforations in the partition plate and means is provided for actuating the valve plate under an appropriate condition. Where the coupling is applied to a driving mechanism for an engine cooling fan, the valve plate may be actuated in accordance with the engine temperature so that the perforations are opened when the engine is warmed up. The housing of the output member is formed with an oil passage connecting the working and oil chambers at a peripheral portion so that the oil in the working chamber is expelled to the oil chamber as the rotor rotates. As long as the engine temperature is low, the perforations in the partition plate are closed so that there is no supply of oil from the oil chamber to the working chamber and the quantity of the oil in the working chamber is decreased to a minimum level by being expelled through the aforementioned passage. Thus, the output member and therefore the engine cooling fan are driven at a minimum or very small speed. When the engine is warmed up, the valve plate is actuated to open the perforations in the partition plate so that there is a continuous supply of oil from the oil chamber to the working chamber. Therefore, the labyrinth groove device is supplied with a sufficient quantity of oil and the rotation of the input member is fully transferred to the output member.

It should however be noted that, in this type of coupling, there is a disadvantage in that when the coupling is held stationary the oil in the oil chamber is transferred through the passage in the housing of the output member to a level wherein the labyrinth groove device is filled with oil. Therefore, when the input member is started to rotate, the rotation is substantially fully transmitted to the output member even if the perforations in the partition plate are closed until the oil in the working chamber is expelled to the oil chamber.

It is therefore an object of the present invention to provide a viscous fluid coupling in which rotation transfer from the input member to the output member during the starting period can be minimized or eliminated.

A further object of the present invention is to provide a viscous fluid coupling which has means for decreasing the oil level in the oil chamber when the coupling is maintained stationary.

According to the present invention, the above and other objects can be accomplished by a viscous fluid coupling including an input member having rotor means, an output member rotatable with respect to the input member and having housing means encircling said rotor means, partition wall means in said housing means for dividing the inside of said housing means into oil chamber means and working chamber means, said rotor means being located in said working chamber means, labyrinth means between said rotor means and said housing means for making it possible to transfer rotation of said rotor means to said housing means under a supply of viscous oil to said labyrinth means, perforation means formed in said partition wall means for establishing a communication between the oil chamber means and the working chamber means so that the viscous oil can be supplied from the oil chamber means to the working chamber means, oil expelling passage means connecting radially outward portions of said oil and working chamber means so that the viscous oil in said working chamber means is expelled to the oil chamber means under pumping action of the rotor means when the rotor means is rotated, valve means associated with said perforation means in said partition wall means, means for actuating said valve means so that said valve means is moved between an open position wherein it opens said perforation means and a close position wherein it closes said perforation means, oil displacing block means disposed in said oil chamber means and normally maintained at a radially inward position but forced radially outwardly under a centrifugal force when said housing means is rotated. According to the features of the present invention, the quantity of the viscous oil in the coupling can substantially be decreased as compared with the conventional coupling so that the oil which may be transferred in the stationary period to the working chamber can very rapidly be expelled to the oil chamber. When the input member is started to rotate, however, the block means is soon forced radially outwardly because the output member is rotated at low speed by a slight amount of residual oil in the area of the labyrinth means so that the oil in the oil chamber is displaced radially inwardly to the area where the perforation means is provided. Thus, it becomes possible to obtain a coupling function as in the conventional structure.

The above and other objects and features of the present invention will become apparent from the following description of a preferred embodiment taking reference to the accompanying drawings, in which.

Figure 1:
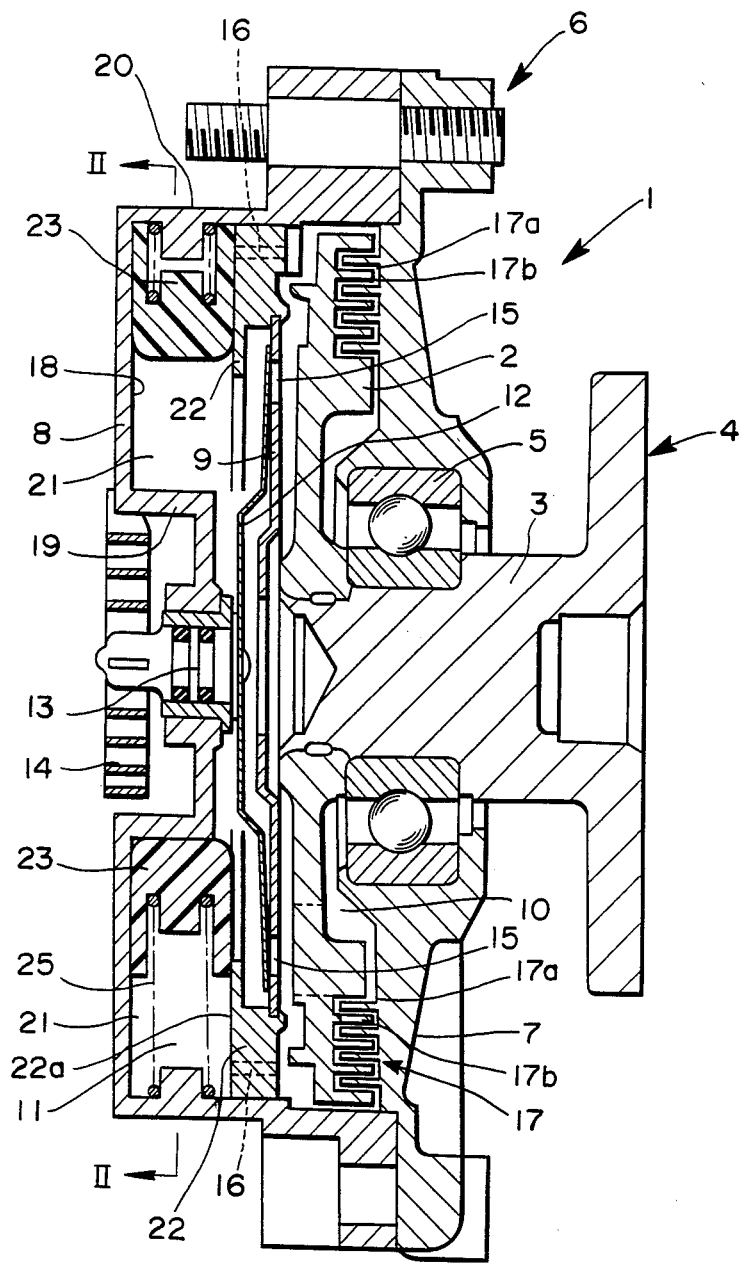
FIG. 1 is a sectional view of a viscous fluid coupling in accordance with one embodiment of the present invention.
Figure 2:
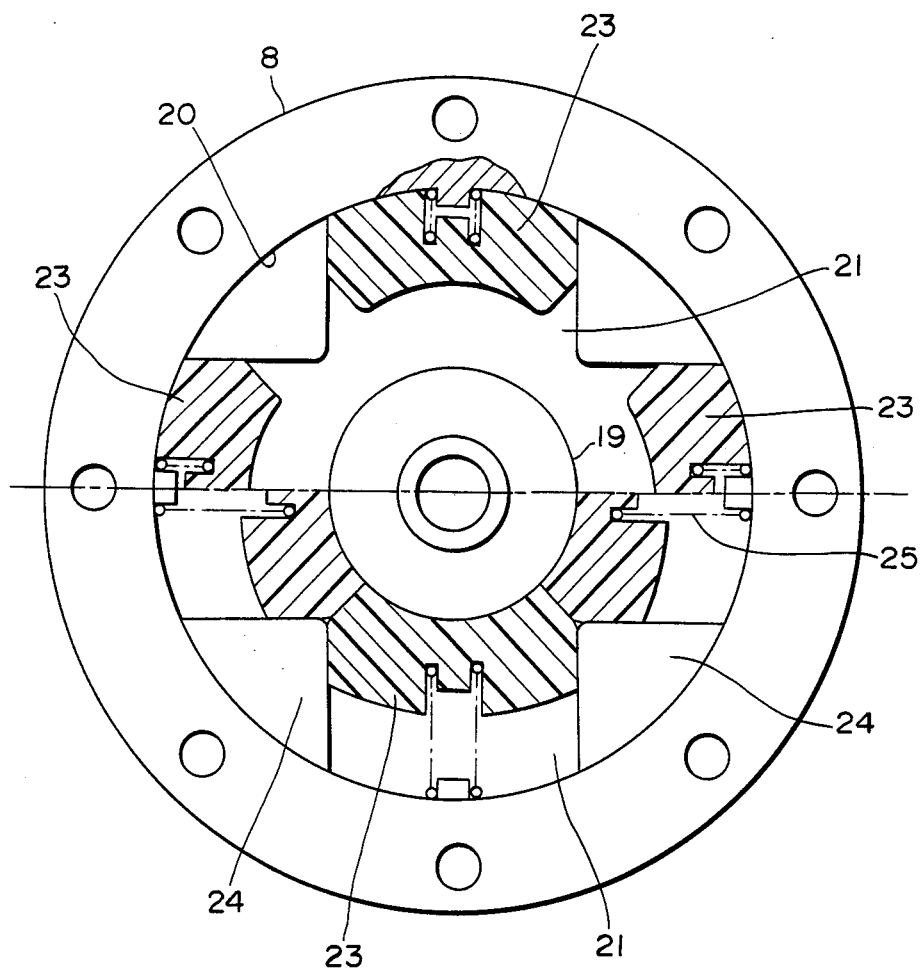
FIG. 2 is a sectional view taken substantially along the line II—II in FIG. 1.

Referring now to the drawings, particularly to FIGS. 1 and 2, there is shown a viscous fluid coupling 1 which includes an input member 4 comprised of a disc-shaped rotor 2 secured to one end of an input shaft 3. The input shaft 3 may be connected with a pulley (not shown) which is in turn connected through a belt to an engine output shaft (not shown) to be driven thereby. The coupling 1 further includes an output member 6 which is comprised of a housing including a casing 7 and a cover plate 8 secured at the periphery thereof to the casing 7 to define a hollow interior space. The housing is supported at the inner periphery of the casing 7 rotatably on the shaft 3 through a bearing 5 with the disc-shaped rotor 2 disposed in the housing.

In the housing, there is a guide plate 22 carrying a partition plate 9 which divides the interior of the housing into a working chamber 10 and an oil chamber 11. The partition plate 9 is formed with a plurality of apertures 15 which connect the oil chamber 11 with the working chamber 10. Further, the guide plate 22 is formed with communication passages 16 which connects the chambers 10 and 11 at diametrically outward portions. As shown in FIG. 1, the perforations 15 in the partition plate 9 are located radially inside with respect to the communication passages 16. A valve plate 12 is provided to cooperate with the perforations 15 in the partition plate 9. The valve plate 12 is connected with a rod 13 which is in turn connected with a temperature responsive element 14 such as a bimetal coil so that the valve plate 12 can be actuated in response to a temperature such as an engine cooling medium temperature. Although not shown in the drawings, the valve plate 12 has holes which cooperate with the apertures 15 in the partition plate 9. The temperature responsive element 14 functions to normally maintain the valve plate 12 at a position wherein it blocks the perforations 15 in the partition plate 9 but, as the temperature increases beyond a predetermined value, the element 14 rotates the valve plate 12 to a position wherein the holes in the plate 12 are aligned with the perforations 15 in the plate 15 to thereby establish a communication between the working chamber 10 and the oil chamber 11 through the perforations 15.

Figure 3:
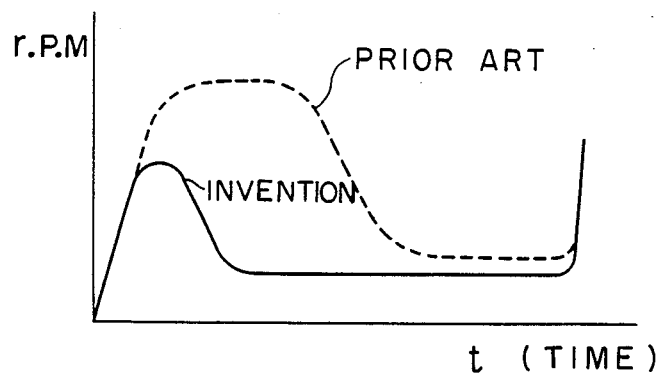
FIG. 3 is a diagram showing changes in the output speed in accordance with the prior art and in the embodiment of the present invention.

The surface of rotor 2 facing the casing 7 includes labyrinth grooves 17a, and the casing 7 includes at its inner surface labyrinth grooves 17b which cooperate with the labyrinth grooves 17a to provide a labyrinth device 17. In the housing, there is hydraulic oil which fills the lower part of the inside space of the housing to a level higher than the lower part of the labyrinth device 17. It will therefore be understood that as the rotor 2 is rotated through the input shaft 3, the rotation is transmitted through the hydraulic oil in the labyrinth device 17 to the casing 7 to thereby rotate the housing. As the rotor 2 rotates, the hydraulic oil in the working chamber 10 is expelled by the rotor 2 through the passages 16 and the working chamber 10 is continuously supplied with hydraulic oil from the oil chamber 11 through the perforations 15 when the apertures 15 are opened by the valve plate 12.

Where the coupling 1 is used in a driving mechanism for a cooling fan adopted in an engine cooling system, the temperature responsive element 14 is located to sense the engine temperature or the engine cooling liquid temperature. Therefore, when the engine is started under a cold state, the valve plate 12 is placed by the temperature responsive element 14 at the position wherein it blocks the perforations 15 in the partition plate 9 so that there will be no supply of hydraulic oil from the oil chamber 11 to the working chamber 10. Therefore, the substantial part of the hydraulic oil in the working chamber 10 is expelled by the rotor 2 to the oil chamber 11 through the passages 16. A small amount of oil is remains in the working chamber 10 so that the housing is rotated at a slow speed even after the substantial part of the hydraulic oil is expelled to the oil chamber 11. Thus, at the engine start period, the rotating speed of the housing or the output member changes as shown by dotted lines in FIG. 3. When the engine temperature increases beyond a predetermined value, the temperature responsive element 14 causes the valve plate 12 to move to the position wherein it opens the apertures 15 in the partition plate 9. It will therefore be understood that in a conventional design, the output member of the fluid coupling 1 is rotated at a relatively high speed for a certain time in the engine start period producing vibrations and resulting in a poor fuel economy.

According to a feature of the present invention, however, there are provided floating blocks 23 in the oil chamber 11 for eliminating or decreasing the aforementioned problems. As shown in FIG. 1, the guide plate 22 is of an annular shape having a guide surface 22a facing to the inner surface 18 of the cover plate 8. Further, as shown in FIG. 2, the cover plate 8 has an outer peripheral wall 20 on the inner surface of which is formed guide blocks 24 so that floating block spaces 21 are defined by the guide blocks 24, the inner surface 18 of the cover plate 8 and the guide surface 22a of the guide plate 22. The floating blocks 23 are disposed in the respective ones of the spaces 21 so as to be guided by the inner surface 18 of the cover plate 8, the guide surface 22a of the guide plate 22 and the guide blocks 24. Each of the floating blocks 23 is associated with a spring 25 which forces the block 23 radially inwardly.

Figure 4:
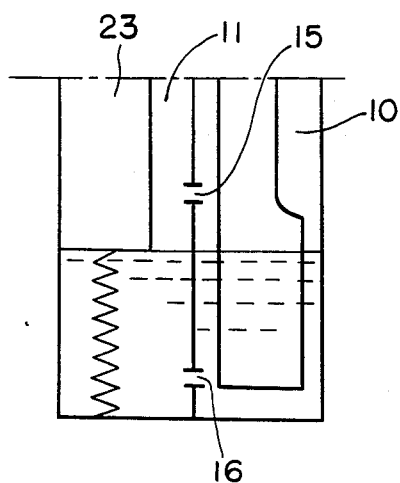
FIGS. 4 and 5 are diagrammatical illustrations showing changes in oil level in the embodiment of the present invention.
Figure 5:
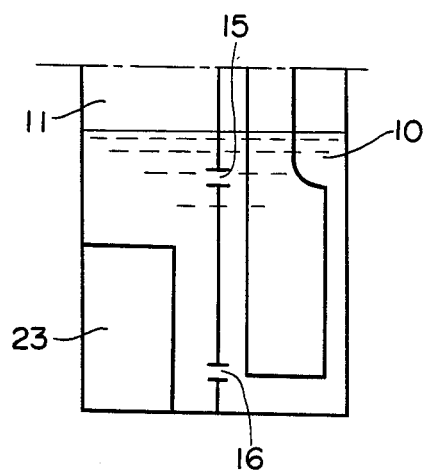

The blocks 23 are therefore maintained at the radially innermost positions as shown in the lower halves of FIGS. 1 and 2 when the housing member of the coupling 1 is not rotating but are displaced to the radially outward positions as shown in the upper halves of FIGS. 1 and 2 when the housing is rotated. When the coupling 1 is held stationary, the oil levels in the working chamber 10 and the oil chamber 11 are the same as shown in FIG. 4. However, when the rotor 2 is started to rotate by being driven through the input shaft 3, the oil in the working chamber 10 is expelled to the oil chamber 11. At the same time, the floating blocks 23 are forced to move radially outwardly under the centrifugal force to the position shown in FIG. 5 since the housing is rotated through the hydraulic oil in the labyrinth device 17. Thus, the oil in the oil chamber 11 is displaced by the blocks 23 to increase the oil level in the chamber 11. With this structure, it is possible to decrease the quantity of oil contained in the coupling 1. In the stationary condition, the oil level may not be high enough to cover the apertures 15 in the partition plate 9. When the output member starts to rotate, the floating blocks 23 are displaced radially outwardly so that the oil level is increased to cover the apertures 15 in the partition plate 9. Since the oil level in the working chamber 10 in the stationary condition can thus be decreased, the oil in the chamber 10 can be very rapidly expelled to the oil chamber 11, so that the rotating speed of the output member can be decreased in the starting period to a remarkable extent as shown by a solid line in FIG. 3.

The invention has thus been shown and described with reference to a specific embodiment, however, it should be noted that the invention is in no way limited to the details of the illustrated structures but changes and modifications may be made without departing from the scope of the appended claims.

We claim:

1. A viscous fluid coupling, comprising:
    an input member rotatable about an axis and including rotor means;

an output member rotatable with respect to said input member about said axis and including housing means enclosing said rotor means and containing a viscous oil, said housing means including a casing portion and a cover plate portion, and said rotor means being positioned axially between said casing portion and said cover plate portion;

partition wall means positioned in said housing means between said rotor means and said cover plate portion for dividing the space enclosed by said housing means into oil chamber means and working chamber means, said rotor means being located within said working chamber means, and said partition wall means including perforation means for allowing said viscous oil to flow from said oil chamber means to said working chamber means;

valve means associated with said perforation means and operable between an open position and a closed position for opening and closing said perforation means to respectively allow and prohibit flow of said viscous oil through said perforation means;

labyrinth means between said rotor means and said housing means in said working chamber means for transferring rotation of said rotor means to said housing means through said viscous oil in said working chamber means;

oil expelling passage means connecting said oil chamber means and said working chamber means radially outside of said perforation means for allowing said viscous oil to be pumped from said working chamber means to said oil chamber means by rotation of said rotor means; and oil displacing block means positioned in said oil chamber means of said housing means, said oil displacing block means being biased in a radially inward position but moving radially outwardly along the inner surface of said cover plate portion under centrifugal force resulting from rotation of said output member, said radial movement of said oil displacing block means causing said viscous oil to flow from said oil chamber means to said working chamber means through said perforation means.

2. A viscous fluid coupling in accordance with claim 1, in which said oil displacing block means includes resilient spring means for biasing said oil displacing block means in the radially inward position.

3. A viscous fluid coupling in accordance with claim 1, wherein said perforation means includes a plurality of perforations in said partition plate and said valve means includes a valve plate having holes alignable with said perforations in said partition plate, said valve plate being rotatable between an open position wherein said holes align with said perforations and a closed position wherein said valve plate blocks said perforations.

4. A viscous fluid coupling in accordance with claim 1, wherein said labyrinth means includes first labyrinth grooves formed in said rotor means and complementary second labyrinth grooves formed in said casing portion of said housing means.

5. A viscous fluid coupling in accordance with claim 1, further comprising temperature responsive actuating means for actuating said valve means between said open and closed positions in response to a temperature reading.

6. A viscous fluid coupling in accordance with claim 2, in which said temperature responsive actuating means normally maintains said valve means in said closed position and actuates said valve means to said open position under a temperature above a predetermined value.

7. A viscous fluid coupling, comprising:

an input member rotatable about an axis and including rotor means;

an output member rotatable with respect to said input member about said axis and including housing means enclosing said rotor means and containing a viscous oil, said housing means including a casing portion and a cover plate portion, and said rotor means being positioned axially between said casing portion and said cover plate portion;

partition wall means positioned in said housing means between said rotor means and said cover plate portion for dividing the space enclosed by said housing means into oil chamber means and working chamber means, said rotor means being located within said working chamber means, and said partition wall means including perforation means for allowing said viscous oil to flow from said oil chamber means to said working chamber means;

valve means associated with said perforation means and operable between an open position and a closed position for opening and closing said perforation means to respectively allow and prohibit flow of said viscous oil through said perforation means;

labyrinth means between said rotor means and said housing means in said working chamber means for transferring rotation of said rotor means to said housing means through said viscous oil in said working chamber means;

oil expelling passage means connecting said oil chamber means and said working chamber means radially outside of said perforation means for allowing said viscous oil to be pumped from said working chamber means to said oil chamber means by rotation of said rotor means; and oil displacing block means positioned in said oil chamber means of said housing means, said oil displacing block means being biased in a radially inward position but moving radially outwardly under centrifugal force resulting from rotation of said output member, said radial movement of said oil displacing block means causing said viscous oil to flow from said oil chamber means to said working chamber means through said perforation means;

wherein said housing means includes guide means for guiding the movement of said oil displacing block means in the radial direction.

8. A viscous fluid coupling in accordance with claim 7, in which said oil displacing block means includes a plurality of blocks and said housing means includes guide surfaces for guiding the movement of said blocks in radial directions.

* * * * *